(12) United States Patent
Cho

(10) Patent No.: US 8,439,514 B2
(45) Date of Patent: May 14, 2013

(54) LIGHTING UNIT, DISPLAY DEVICE AND TELEVISION RECEIVER

(75) Inventor: Shiyoshi Cho, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 82 days.

(21) Appl. No.: 12/996,830

(22) PCT Filed: Feb. 17, 2009

(86) PCT No.: PCT/JP2009/052664
§ 371 (c)(1),
(2), (4) Date: Dec. 8, 2010

(87) PCT Pub. No.: WO2009/154017
PCT Pub. Date: Dec. 23, 2009

(65) Prior Publication Data
US 2011/0096247 A1    Apr. 28, 2011

(30) Foreign Application Priority Data
Jun. 16, 2008   (JP) .................. 2008-156905

(51) Int. Cl.
*G09F 13/04*   (2006.01)
*G09F 13/08*   (2006.01)

(52) U.S. Cl.
USPC ........... 362/97.2; 362/614; 362/97.1; 349/61; 349/62; 315/70

(58) Field of Classification Search .......... 362/600–634; 362/97.1–97.4; 349/61, 62; 315/70
See application file for complete search history.

(56) References Cited

U.S. PATENT DOCUMENTS

| 5,030,887 | A | * | 7/1991 | Guisinger | .............. | 315/158 |
| 2003/0193283 | A1 | * | 10/2003 | Aoki | .............. | 313/269 |
| 2006/0044780 | A1 | | 3/2006 | Kim | | |
| 2010/0165602 | A1 | * | 7/2010 | Kuromizu | .............. | 362/97.2 |

FOREIGN PATENT DOCUMENTS

| JP | 04-079330 U | 7/1992 |
| JP | 2000-285867 A | 10/2000 |
| JP | 2006-066360 A | 3/2006 |

OTHER PUBLICATIONS

Official Communication issued in International Patent Application No. PCT/JP2009/052664, mailed on Apr. 14, 2009.

* cited by examiner

*Primary Examiner* — Evan Dzierzynski
*Assistant Examiner* — Danielle Allen
(74) *Attorney, Agent, or Firm* — Keating & Bennett, LLP

(57) ABSTRACT

A lighting unit 12 of the present invention includes a light source 17, a chassis that covers the light source 17 and a vibration absorber 70 provided in a mat-like form and arranged between the light source 17 and the chassis 14. The vibration absorber 70 is made of gelatinous material. With this configuration, the vibration absorber 70 blocks vibration propagation from the light source 17 to the chassis 14. As a result, a roaring sound is properly eliminated or reduced.

20 Claims, 13 Drawing Sheets

LIGHTING UNIT, DISPLAY DEVICE AND TELEVISION RECEIVER

TECHNICAL FIELD

The present invention relates to a lighting unit, and a display device and a television receiver including the lighting unit.

BACKGROUND ART

In a display device using non-light-emitting optical components, a backlight unit including light sources is disposed behind a display panel for illuminating the display panel (for instance, one that is disclosed in Patent Document 1). An example of such a display device is a liquid crystal display device and an example of such a display panel is a liquid crystal panel.

Patent Document 1: Japanese Published Patent Application No. 2006-66360

Problem to be Solved by the Invention

Patent Document 1 discloses a backlight assembly including lamps and a housing that houses the lamp. Such a backlight assembly including the lamps and the housing may produce a roaring sound during brightness control of the lamp. Various factors could be considered for a cause of the roaring sound. For example, vibrations of the lamps may propagate to the housing and a vibration of the housing may sound like roaring.

Patent Document 1 discloses a configuration in which protrusions or recesses are provided in the housing at points corresponding to the lamps. Although a large distance can be provided between the lamps and the housing, the roaring sound cannot be reduced.

DISCLOSURE OF THE PRESENT INVENTION

The present invention was made in view of the foregoing circumstances. An object of the present invention is to provide a lighting unit with a simple configuration to eliminate or reduce a roaring sound.

Another object of the present invention is to provide a display device including such a lighting unit and having high quality and reliability.

Still another object of the present invention is to provide a television receiver including such a display device and having high quality and reliability.

Means for Solving the Problem

To solve the above problem, a display device of the present invention includes at least one light source, a chassis that covers the light source and a vibration absorber provided in a mat-like form and arranged between the light source and the chassis.

The lighting unit includes the vibration absorber between the light source and the chassis, and the vibration absorber is provided in a mat-like form, that is, laid out between the light source and the chassis. Moreover, the vibration absorber is made of gelatinous material. Therefore, a vibration of the light source is less likely to propagate to the chassis. Specifically, the vibration absorber can properly absorb the vibration over an entire area of the chassis where the vibration absorber is laid out by providing it in the mat-like form. By making the vibration absorber from the gelatinous material, the vibration absorbing ability can be enhanced and shock absorbing ability is provided in addition to the vibration absorbing ability. As a result, the light source does not receive any impact even when the light source is in contact with the vibration absorber.

The vibration of the light source is created based on the natural vibration thereof. If the natural vibration matches the harmonic that is present during brightness control of the light source, it resonates with the harmonic. If the resonance vibration propagates directly to the chassis, resonance may occur at the chassis and thus a large roaring sound may be produced. According to the present invention, the vibration absorber made of gelatinous material and provided in the mat-like form is arranged between the light source and the chassis. Therefore, such vibration propagation can be blocked and the roaring sound is properly reduced.

BEST MODE FOR CARRYING OUT THE INVENTION

An embodiment of the present invention will be explained with reference to figures.

Figure 1:
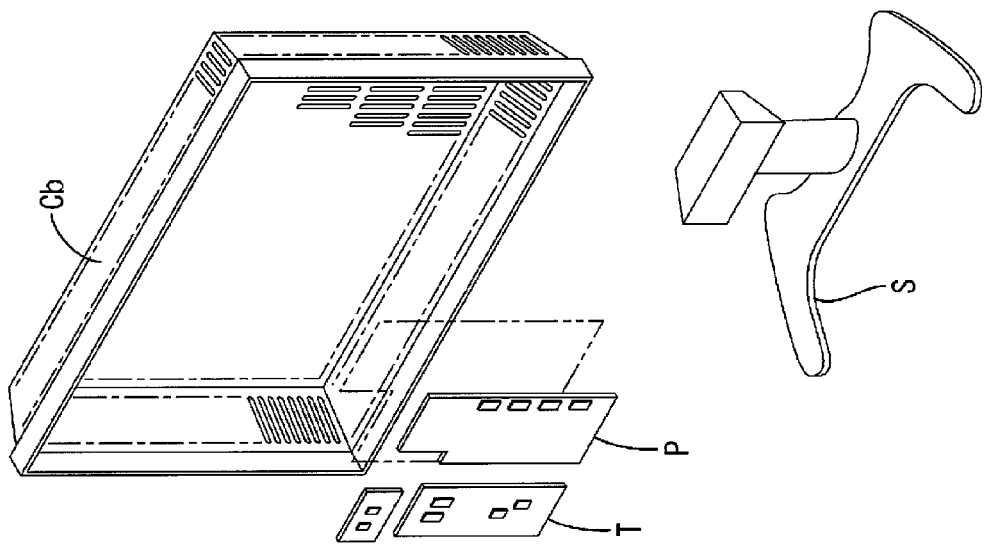
FIG. 1 is an exploded perspective view illustrating an overall construction of the television receiver according to an embodiment of the present invention.
Figure 1:
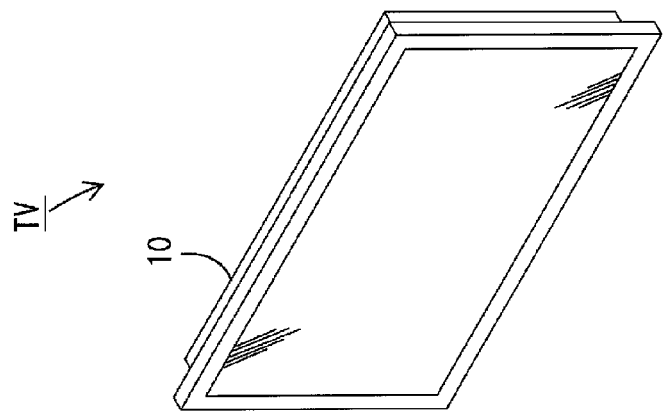
Figure 1:
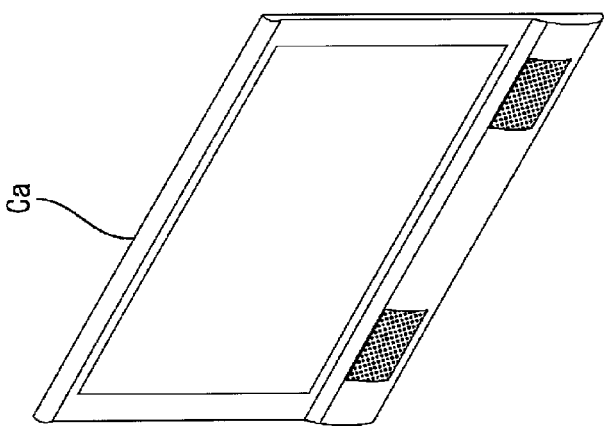
Figure 2:
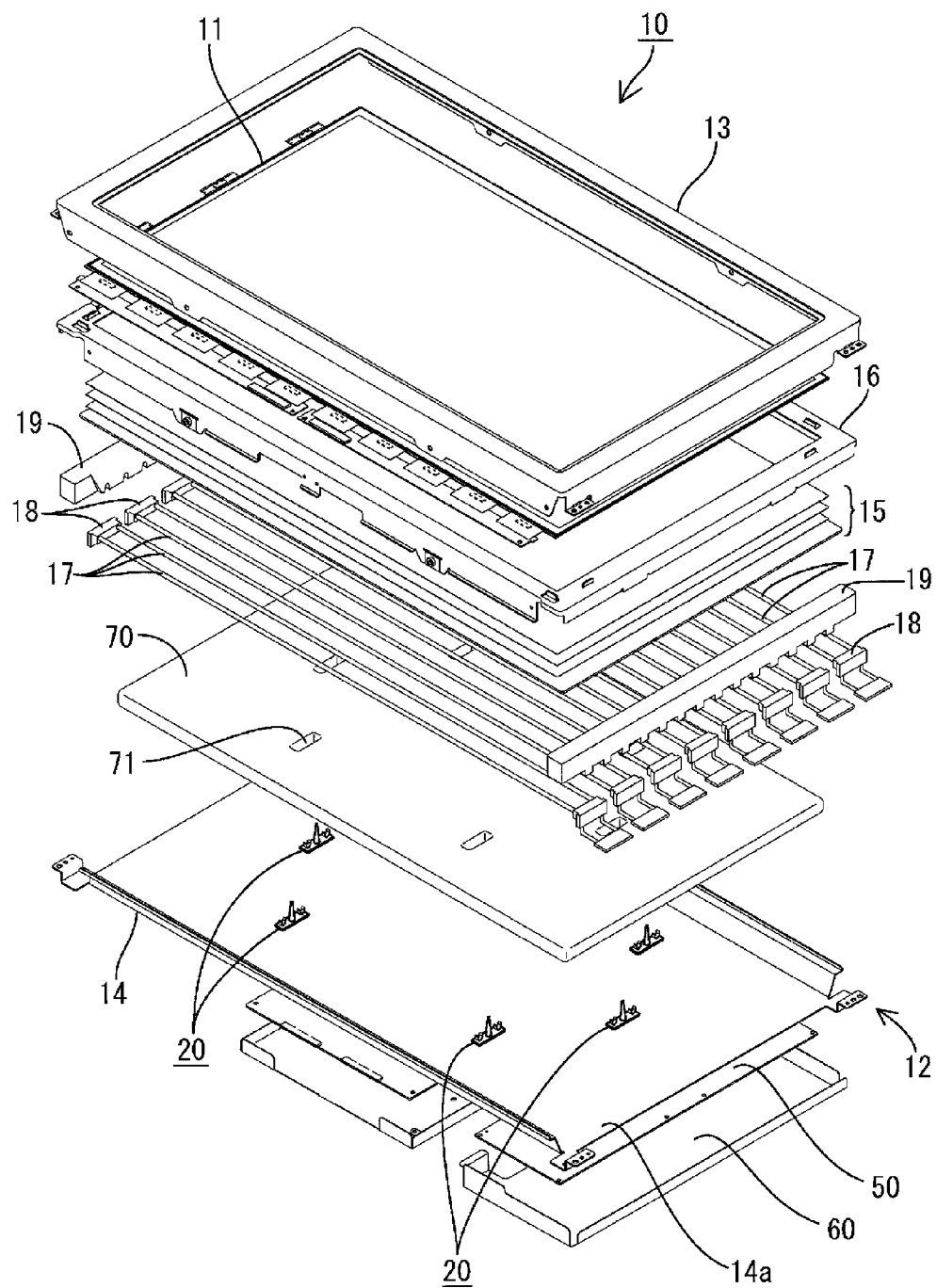
FIG. 2 is an exploded perspective view illustrating a general construction of a liquid crystal display device included in the television receiver.
Figure 3:
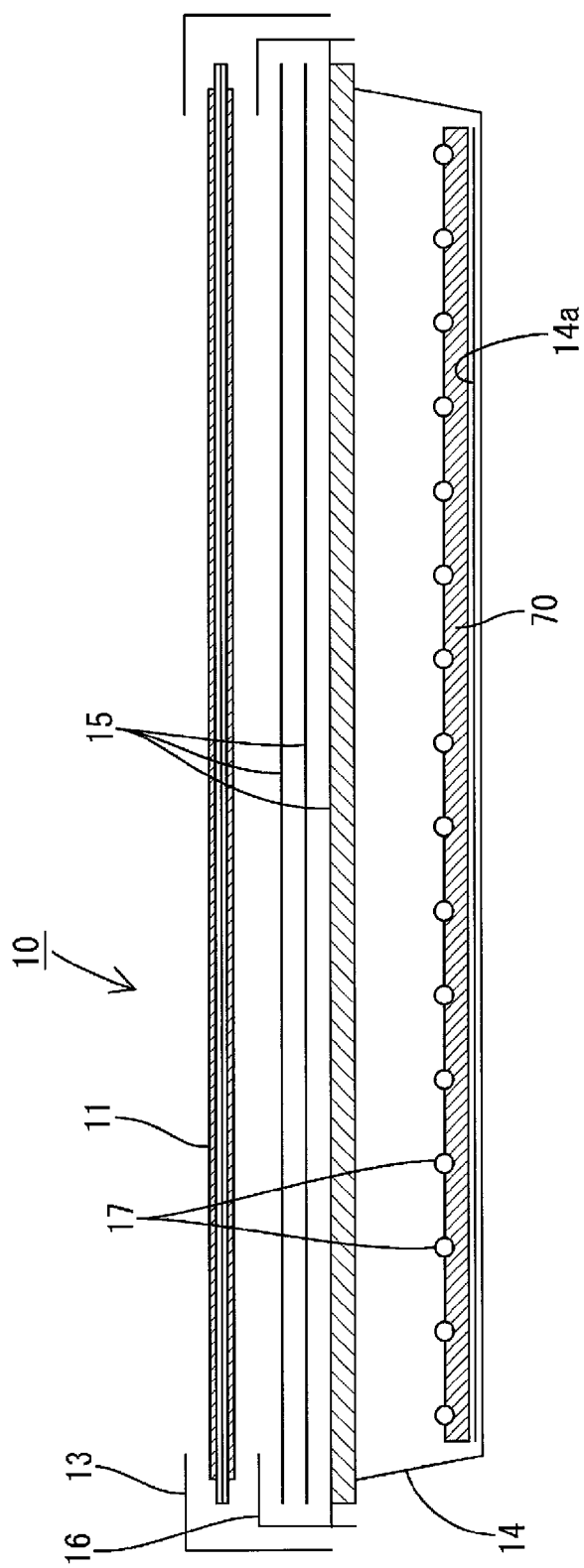
FIG. 3 is a cross-sectional view illustrating a general construction of the liquid crystal display device.
Figure 4:
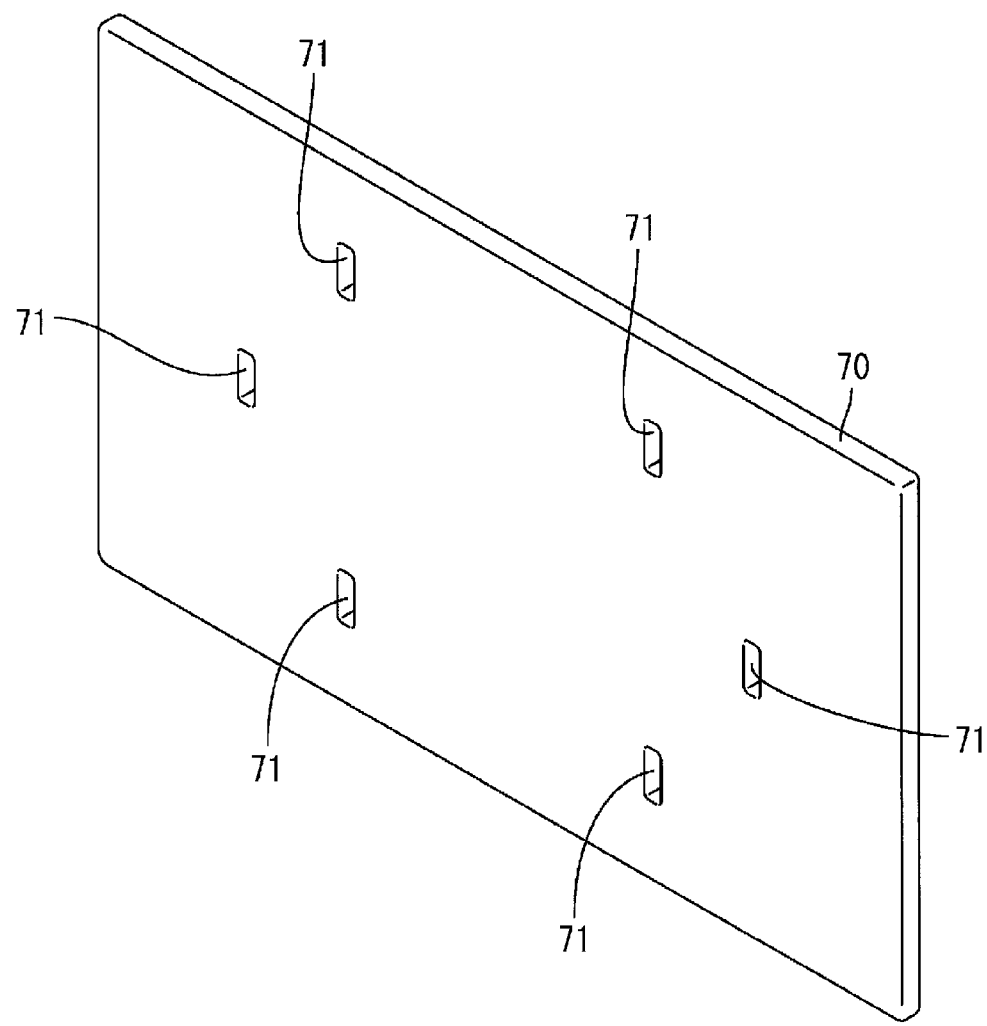
FIG. 4 is a perspective view illustrating a general construction of a vibration absorber included in the liquid crystal display device.
Figure 5:
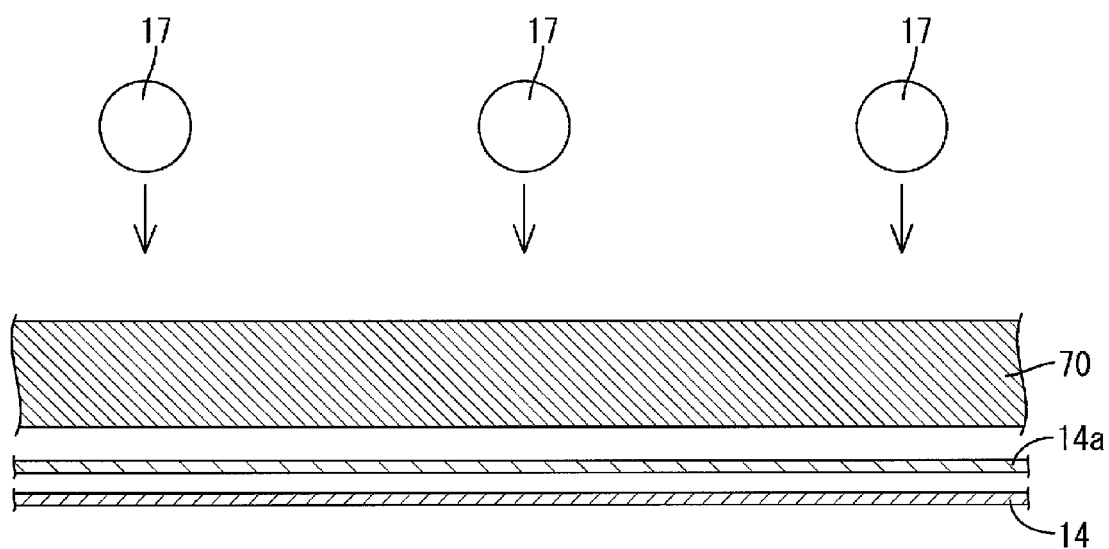
FIG. 5 is an exploded explanatory view schematically illustrating components of the liquid crystal display device, the components being located from cold cathode tubes to a chassis.
Figure 6:
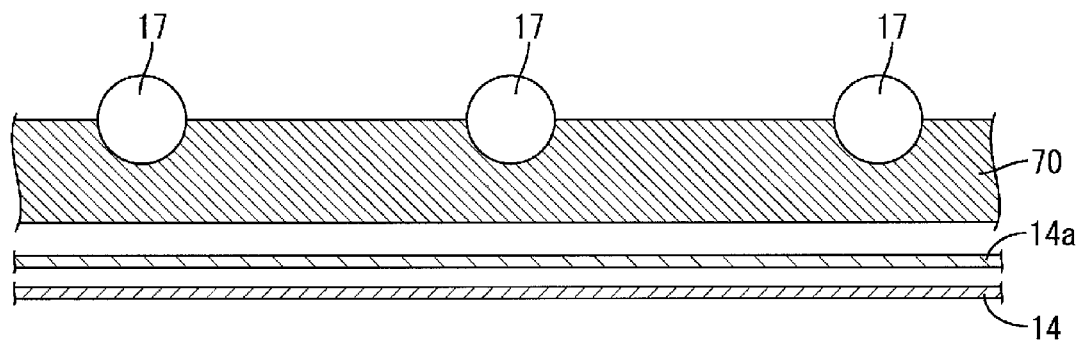
FIG. 6 is an explanatory view schematically illustrating the liquid crystal display device with the cold cathode tubes embedded in the vibration absorber.
Figure 7:
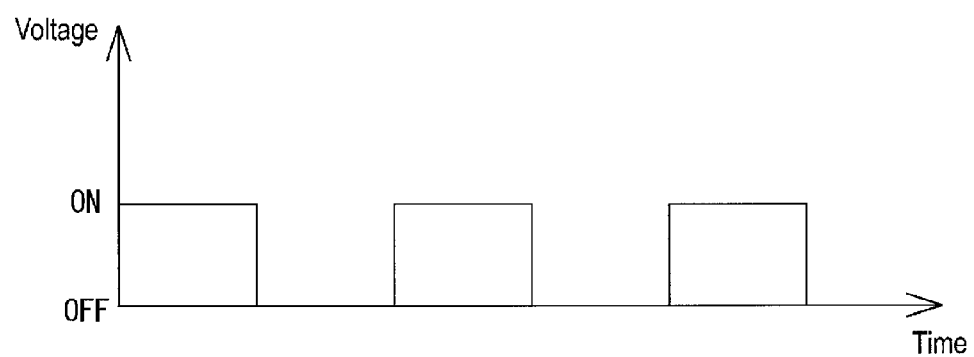
FIG. 7 is a chart illustrating driving conditions of a cold cathode tube used in the liquid crystal display device.

FIG. 1 is an exploded perspective view illustrating an overall construction of the television receiver of this embodiment. FIG. 2 is an exploded perspective view illustrating a general construction of a liquid crystal display device included in the television receiver. FIG. 3 is a cross-sectional view illustrating a general construction of the liquid crystal display device. FIG. 4 is a perspective view illustrating a general construction of a vibration absorber included in the liquid crystal display device. FIG. 5 is an exploded explanatory view schematically illustrating components of the liquid crystal display device, the components being located from cold cathode tubes to a chassis. FIG. 6 is an explanatory view schematically illustrating the liquid crystal display device with the cold cathode tubes embedded in the vibration absorber. FIG. 7 is a chart illustrating driving conditions of a cold cathode tube used in the liquid crystal display device.

As illustrated in FIG. 1, the television receiver TV of this embodiment includes a liquid crystal display device (a display device) 10, front and rear cabinets Ca and Cb that house the liquid crystal display device 10 therebetween, a power source P, a tuner T and a stand S. The liquid crystal display device 10 has a landscape rectangular overall shape. As illustrated in FIG. 2, the liquid crystal display device 10 includes a liquid crystal panel (a display panel) 11, which is a display panel having a rectangular plan view, and a backlight unit (a lighting unit or a lighting unit for display device) 12, which is an external light source. They are held together with a bezel 13.

The liquid crystal panel 11 is constructed such that a pair of glass substrates is bonded together with a predetermined gap therebetween and liquid crystals are sealed between the glass substrates. On one of the glass substrates, switching components (e.g., TFTs) connected to source lines and gate lines that are perpendicular to each other, pixel electrodes connected to the switching components, and an alignment film are provided. On the other substrate, color filter having color sections such as R, G and B color sections arranged in a predetermined pattern, counter electrodes, and an alignment film are provided.

Next, the backlight unit 12 will be explained. As illustrated in FIGS. 2 and 3, the backlight unit 12 is a direct backlight unit and includes a plurality of linear light sources arranged closely below a panel surface (a display surface) of the liquid crystal panel 11 along the panel surface. Cold cathode tubes (tubular light sources) 17 are used as high-pressure discharge tubes in this embodiment.

The backlight device 12 includes a backlight chassis (a chassis) 14, a plurality of optical members 15, a frame 16, the cold cathode tubes (light sources) 17, holders 18, lamp holders 19, lamp clips 20 and a vibration absorber 70. The backlight chassis 14 is made of metal and has a substantially box shape with an opening on the top. The optical members 15 (including a diffuser plate, a diffuser sheet, a lens sheet and an optical sheet arranged in this order from the lower side of the figures) are arranged so as to cover the opening of the backlight chassis 14. The frame 16 holds the optical members 15 to the backlight chassis 14. The cold cathode tubes (light sources) 17 are housed in the backlight chassis 14. The holders 18 are made of rubber (e.g., silicon rubber) and hold respective ends of the cold cathode tubes 17. The lamp holders 19 collectively cover the ends of the cold cathode tubes 17 and the holders 18. The lamp clips 20 are provided for mounting the cold cathode tubes 17 to the backlight chassis 14 and holding them. The vibration absorber 70 is laid out between the cold cathode tubes 17 and the backlight chassis 14. A light output side of the backlight unit 12 is a side closer to the optical member 15 than the cold cathode tubes 17.

Each cold cathode tube 17 has an elongated tubular shape. A number of the cold cathode tubes 17 (sixteen in FIG. 1) are installed in the backlight chassis 14 such that they are arranged parallel to each other with the long-side direction thereof (the axial direction) aligned along the long-side direction of the backlight chassis 14. The lamp clips 20 are provided for mounting the cold cathode tube 17 to the backlight chassis 14. Each of them is made of synthetic resin (e.g., polycarbonate) and function as a clip-type light source holding member. A plurality of the lamp clips 20 are mounted to the backlight chassis 14 for each cold cathode tube 17 so as to hold the cold cathode tube 17 at two or three points in the longitudinal direction thereof.

The backlight chassis 14 formed in a substantially shallow box shape by metal plate processing. A light reflecting surface is formed on the inner surface of the backlight chassis 14 (on the light source side) with a light reflecting sheet 14a. The backlight chassis 14 including the light reflecting sheet 14a can reflect light emitted from the cold cathode tubes 17 toward the optical members 15 including the light diffuser plate (hereinafter also referred to as a diffuser plate 15). The light reflecting sheet 14a is a resin sheet having light reflectivity, for example.

The vibration absorber 70 is made of gelatinous material having transparency and flexibility, and provided in a mat-like form. It is laid out on substantially an entire surface of the backlight chassis (in an entire area in which the cold cathode tubes 17 are arranged). The vibration absorber 70 made of the gelatinous material is elastically deformable. As illustrated in FIG. 5, the flat surface of the vibration absorber 70 is elastically deformed when the cold cathode tubes 17 are pressed against it. As illustrated in FIG. 6, a part of each cold cathode tube 17 below a half of the thickness thereof (specifically, ¼ to ½ of the thickness) is embedded in the vibration absorber 70. As a result, the cold cathode tubes 17 are positioned in the vibration absorber 70. Furthermore, the cold cathode tubes 17 and the vibration absorber 70 are in elastic contact with each other.

As illustrated in FIG. 4, the vibration absorber 70 has a plurality of clip insertion holes 71 in which the lamp clips 20 (see FIG. 2) can be inserted. The clip insertion holes 71 are through holes and arranged so as to correspond to locations where the lamp clips are arranged. Each lamp clip 20 is fixed to the backlight chassis 14 with one of ends thereof inserted in the clip insertion hole 71. The other end arranged on the front surface of the vibration absorber 70 holds the cold cathode tube 17 such that the cold cathode tube 17 is positioned and fixed to the backlight chassis 14.

As illustrated in FIG. 2, an inverter board 50 is mounted to the outer surface of the backlight chassis 14, which is located on a side opposite from the side on which the cold cathode tubes 17 are arranged (opposite side from the light output side). The inverter board 50 is provided for supplying driving power to the cold cathode tubes 17. It includes an inverter circuit that generates a high frequency voltage for turning on the cold cathode tubes 17. Especially in this embodiment, one of the ends of each cold cathode tube 17 is connected to the inverter circuit such that the cold cathode tube 17 is driven with a high voltage applied to one of the ends. In this embodiment, each cold cathode tube 17 is driven by a pulse width modulation method (PWM method) illustrated in FIG. 7, for example. Namely, a method in which the brightness of the cold cathode tubes 17 is controlled with a predetermined period is used.

According to the liquid crystal display device 10 of this embodiment, the following operational effects are achieved.

The liquid crystal display device 10 of this embodiment includes the backlight unit 12 that includes the vibration absorber 70 between the cold cathode tubes 17 and the backlight chassis 14. The vibration absorber 70 is provided in a mat-like form, that is, laid out over an area between the cold cathode tubes 17 and the backlight chassis 14. Moreover, the vibration absorber 70 is made of gelatinous material. Therefore, the vibrations of the cold cathode tubes 17 are less likely to propagate to the backlight chassis 14.

Specifically, because the vibration absorber 70 is provided in a mat-like form, it can absorb the vibrations over substantially the entire area of the backlight chassis 14 in which the vibration absorber 70 is laid out. Furthermore, because the vibration absorber 70 is made of gelatinous material, it is more likely to absorb the vibrations than one that is made of solid material. It also has a shock absorbing function in addition to the vibration absorbing function. Especially when the cold cathode tubes 17 come in contact with the vibration absorber 70, the cold cathode tubes 17 do not receive any impacts when they are brought into contact with the vibration absorber 70.

The vibration of each cold cathode tube 17 is produced based on the natural vibration thereof. In this embodiment, the brightness of the cold cathode tube 17 is controlled by the pulse width modulation. If the harmonic of the pulse matches the natural vibration, resonance occurs. When the resonance vibration directly propagates to the backlight chassis 14, resonance occurs at the backlight chassis 14. If the vibration absorber 70 is not provided, a large roaring sound tends to be produced. In this embodiment, the vibration absorber 70 made of gelatinous material and provided in a mat-like form is arranged between the cold cathode tubes 17 and the backlight chassis 14. It blocks the vibration propagation and properly reduces the roaring sound.

In this embodiment, a plurality of the cold cathode tubes 17 are provided as light sources. The vibration absorber 70 is laid out over the entire area in which the cold cathode tubes 17 are arranged. The cold cathode tubes 17 having a linear shape are arranged parallel to each other and the vibration absorber 70 is laid out over the entire area in which the cold cathode tubes 17 are arranged parallel to each other. By laying out the vibration absorber 70 over the entire area in which the cold cathode tubes 17 are arranged, the vibration propagation from the cold cathode tubes 17 to the backlight chassis 14 is further blocked or reduced with a simple configuration.

In this embodiment, parts of the cold cathode tubes (tubular light sources) 17 below the half of the thickness thereof are embedded in the vibration absorber 70. By embedding the parts of the cold cathode tubes 17 below the half of the thickness thereof in the vibration absorber 70, large contact areas (or large opposed areas) between the vibration absorber 70 and the cold cathode tubes 17 can be achieved. Therefore, the vibration absorption and the shock absorption by the vibration absorber 70 are further properly performed. Moreover, parts (lower halves) of the cold cathode tubes 17 are embedded in the vibration absorber 70 and thus the cold cathode tubes 17 are held by the vibration absorber 70. Namely, the cold cathode tubes 17 are positioned.

In this embodiment, the cold cathode tubes 17 and the vibration absorber 70 are inelastic contact with each other. By making elastic contacts between the cold cathode tubes 17 and the vibration absorber 70, the vibration absorption and the shock absorption are further properly performed by the vibration absorber 70.

The present invention is not limited to the above embodiment explained with reference to figures. For example, the following embodiments may be included in the technical scope of the present invention. Moreover, various modifications to the above embodiment can be made within the technical scope of the present invention.

<First Modification of the Vibration Absorber 70>

Figure 8:
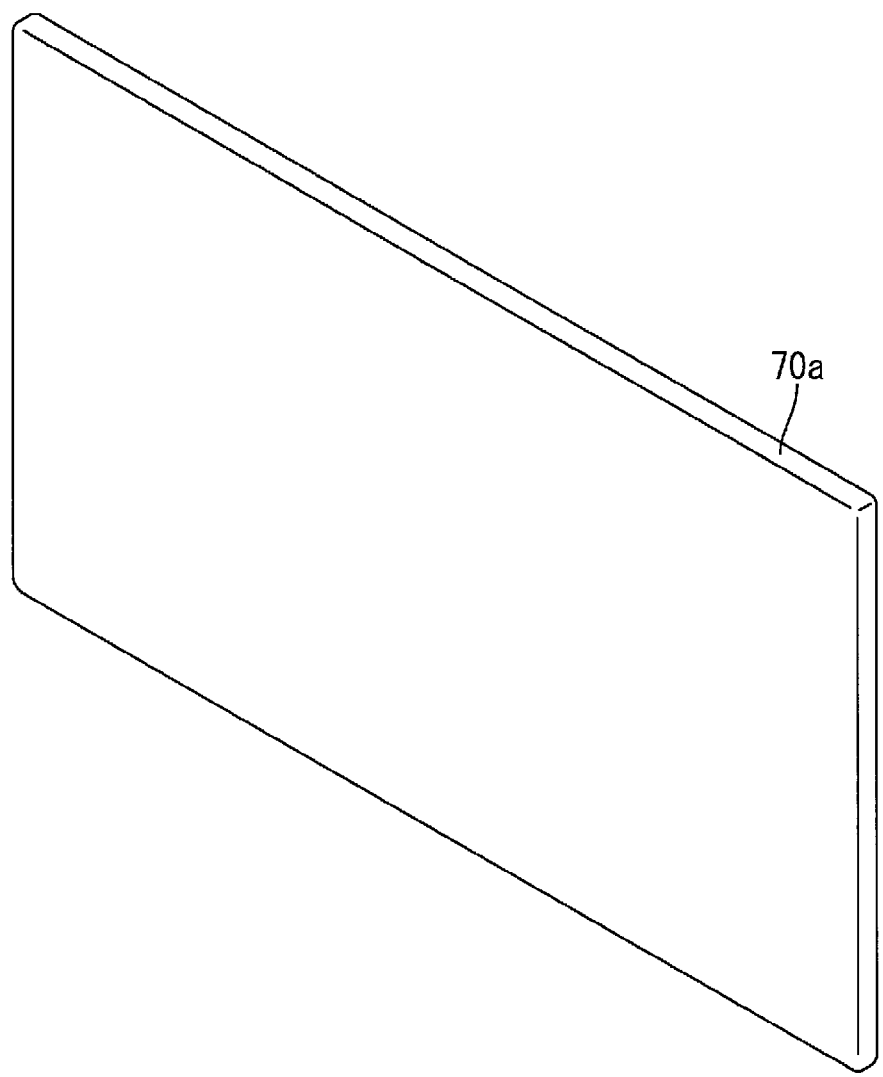
FIG. 8 is a perspective view illustrating a modification of the vibration absorber.

FIG. 8 is a perspective view illustrating a modification of the vibration absorber. In the above embodiment, each cold cathode tube 17 is fixed to the backlight chassis 14 with the lamp holders 19 and the lamp clips 20. However, each cold cathode tube 17 can be held by the vibration absorber 70 when it is embedded in the vibration absorber 70. Namely, the cold cathode tube 17 can be fixed to the backlight chassis 14 only with the lamp holders 19 that hold the ends of the cold cathode tube 17 to the backlight chassis 14 without using the lamp clips 20. Therefore, a vibration absorber 70a without clip insertion holes illustrated in FIG. 8 can be used in an embodiment of the present invention.

<Second Modification of the Vibration Absorber 70>

Figure 9:
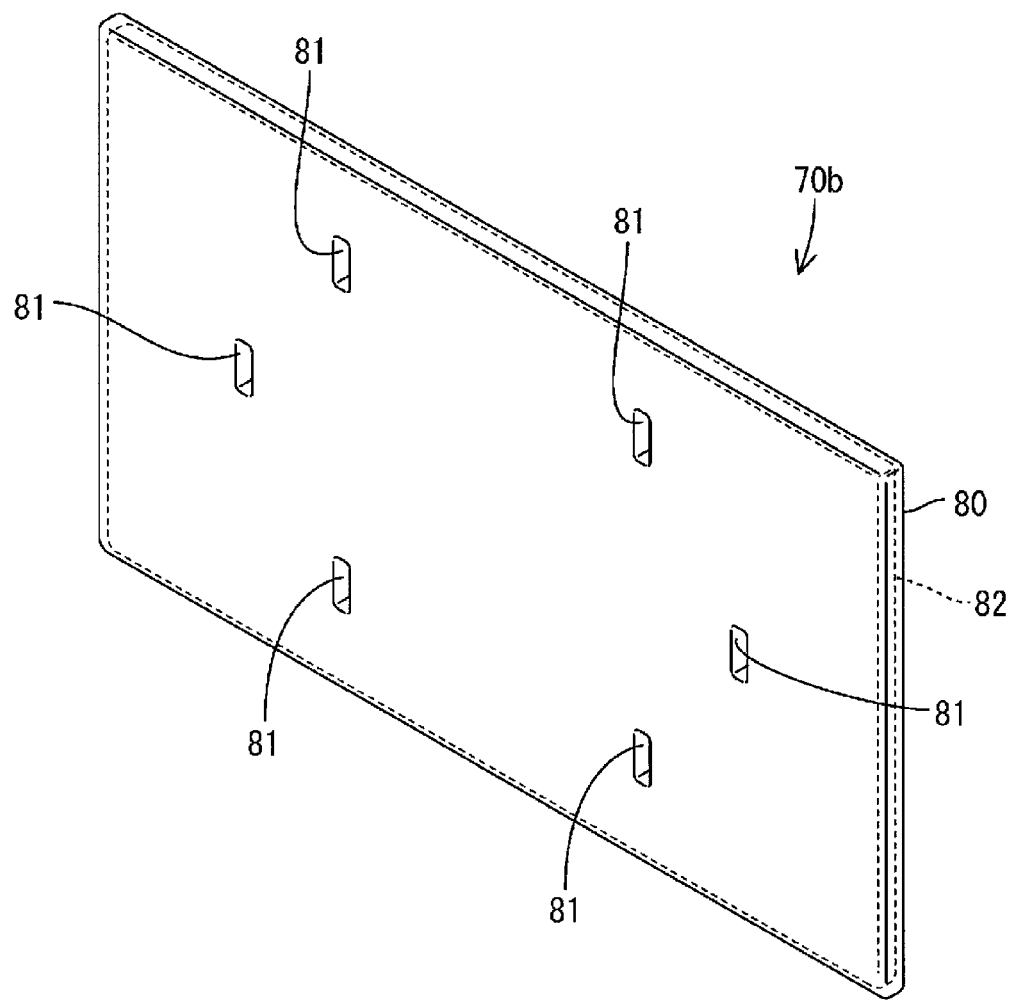
FIG. 9 is a perspective view illustrating a different modification of the vibration absorber.
Figure 10:
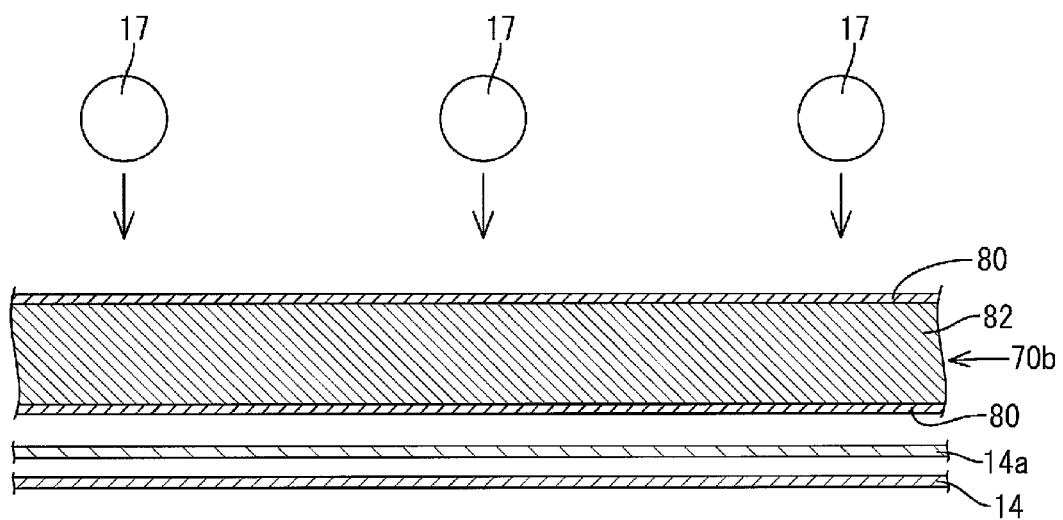
FIG. 10 is an exploded explanatory view schematically illustrating components of the liquid crystal display device including the vibration absorber in FIG. 9, the components being located from cold cathode tubes to a chassis.
Figure 11:
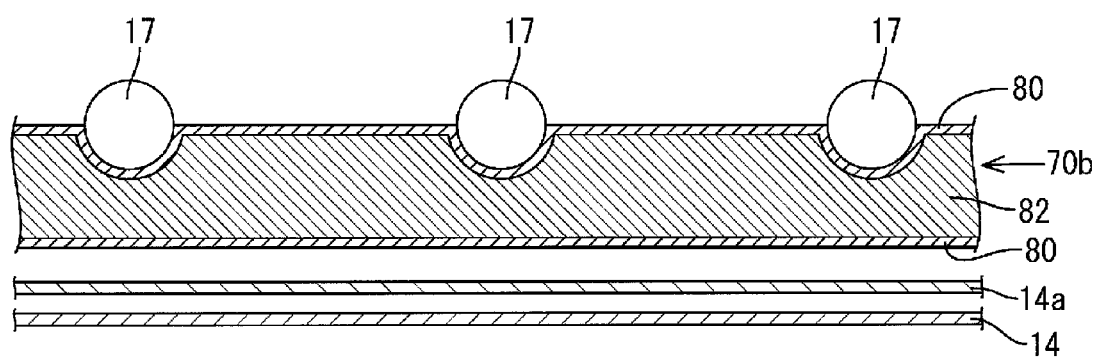
FIG. 11 is an explanatory view schematically illustrating the liquid crystal display device with the cold cathode tubes embedded in the vibration absorber in FIG. 9.

FIG. 9 is a perspective view illustrating a modification of the vibration absorber. FIG. 10 is an exploded explanatory view schematically illustrating components of the liquid crystal display device including the vibration absorber, the components being located from cold cathode tubes to a chassis. FIG. 11 is an explanatory view schematically illustrating the liquid crystal display device with the cold cathode tubes embedded in the vibration absorber.

A vibration absorber 70b illustrated in FIG. 9 is constructed of a packaging member 80 including transparent films and gelatinous material 82 inside the packaging member 80. Cellulose films or polyolefin films can be used for the packaging member 80. When the lamp clips 20 (see FIG. 2) are used, the vibration absorber 70b having clip insertion holes 81 as illustrated in FIG. 9 can be used. Silicon or light transmissive polymer having high viscosity can be used for the gelatinous material 82.

When the cold cathode tubes 17 are pressed against the surface of the vibration absorber 70b as illustrated in FIG. 10, the lower halves of the cold cathode tubes 17 are embedded in the vibration absorber 70b as illustrated in FIG. 11. In this case, the cold cathode tubes 17 come in contact with the packaging member 80 and the contact is elastic contact created by elastic deformation of the gal-like material 82.

Other Embodiments

Figure 12:
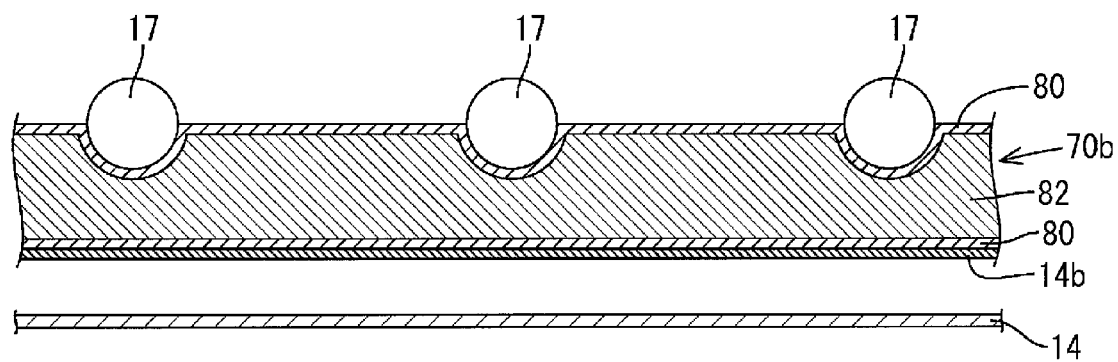
FIG. 12 is a perspective view illustrating another modification of the vibration absorber in FIG. 9.

As illustrated in FIG. 12, the surface of the packaging member 80 away from the cold cathode tubes 17 and facing the backlight chassis 14 can be coated with a reflecting film 14b. In this configuration, the reflecting sheet 14a is not required. The surface of the packaging member 80 away from the cold cathode tubes 17 and contacting the gelatinous material 82 (i.e., the inner surface) can be coated with the reflecting film 14b.

Figure 13:
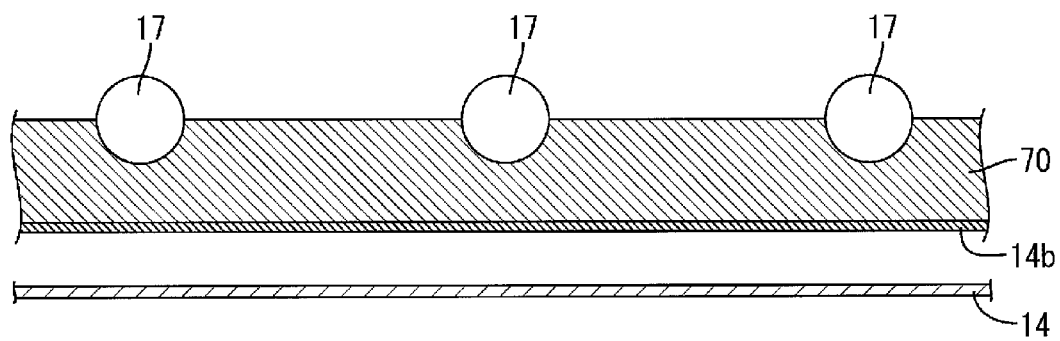
FIG. 13 is a perspective view illustrating another modification of the vibration absorber in FIG. 4.

As illustrated in FIG. 13, the vibration absorber 70 in the above embodiment can be coated with the reflecting film 14b. Namely, the reflecting film 14b can be formed on the surface of the vibration absorber 70 facing the backlight chassis 14. As a result, the reflecting sheet 14a is not required.

In the above embodiment, one of the ends of each cold cathode tube 17 is a high voltage end. However, the above configurations can be applied for the backlight unit 12 in which both ends of each cold cathode tube 17 are high voltage ends.

In the above embodiment, the TFTs are used as switching components of the liquid crystal display device. However, the configurations can be applied to a liquid crystal display device in which switching components other than the TFTs (e.g., thin film diodes (TFDs)) are used. They can be applied not only to a liquid crystal display device that provides color display but also a liquid crystal display that provides black-and-white display.

Furthermore, the liquid crystal display device is used in the above embodiment. However, the configurations are not limited to the liquid crystal display device. They can be applied to other types of display devices that use backlight units.

The invention claimed is:

1. A lighting unit comprising:
   at least one light source;
   a chassis that covers the light source; and
   a vibration absorber provided in a mat-like form and arranged between the light source and the chassis, wherein
   the vibration absorber is made of gelatinous material;
   the at least one light source includes a plurality of light sources; and
   the vibration absorber is laid out over an entire area in which the light sources are arranged.

2. The lighting unit according to claim 1, wherein the light source and the vibration absorber are in elastic contact with each other.

3. The lighting unit according to claim 1, wherein the light source is configured to be driven by a pulse width modulation.

4. A display device comprising:
   the lighting unit according to claim 1; and
   a display panel configured to provide display using light from the lighting unit.

5. The display device according to claim 4, wherein the display panel is a liquid crystal panel using liquid crystals.

6. A television receiver comprising the display device according to claim 4.

7. The lighting unit according to claim 1, wherein:
   the at least one light source includes a plurality of linear light sources arranged parallel to each other; and
   the vibration absorber is laid out over an entire area in which the light sources are arranged parallel to each other.

8. The lighting unit according to claim 1, wherein:
   the at least one light source is a tubular light source; and
   a part of the light source below a half of a thickness thereof is embedded in the vibration absorber.

9. A lighting unit comprising:
   at least one light source;
   a chassis that covers the light source; and
   a vibration absorber provided in a mat-like form and arranged between the light source and the chassis, wherein
   the vibration absorber is made of gelatinous material;
   the at least one light source includes a plurality of linear light sources arranged parallel to each other; and
   the vibration absorber is laid out over an entire area in which the light sources are arranged parallel to each other.

10. The lighting unit according to claim 9, wherein:
    the at least one light source is a tubular light source; and
    a part of the light source below a half of a thickness thereof is embedded in the vibration absorber.

11. The lighting unit according to claim 9, wherein the light source and the vibration absorber are in elastic contact with each other.

12. The lighting unit according to claim 9, wherein the light source is configured to be driven by a pulse width modulation.

13. A display device comprising:
    the lighting unit according to claim 9; and
    a display panel configured to provide display using light from the lighting unit.

14. The display device according to claim 13, wherein the display panel is a liquid crystal panel using liquid crystals.

15. A television receiver comprising the display device according to claim 13.

16. A lighting unit comprising:
    at least one light source;
    a chassis that covers the light source; and
    a vibration absorber provided in a mat-like form and arranged between the light source and the chassis, wherein
    the vibration absorber is made of gelatinous material;
    the at least one light source is a tubular light source; and
    a part of the light source below a half of a thickness thereof is embedded in the vibration absorber.

17. The lighting unit according to claim 16, wherein the light source and the vibration absorber are in elastic contact with each other.

18. The lighting unit according to claim 16, wherein the light source is configured to be driven by a pulse width modulation.

19. A display device comprising:
    the lighting unit according to claim 16; and
    a display panel configured to provide display using light from the lighting unit, wherein
    the display panel is a liquid crystal panel using liquid crystals.

20. A television receiver comprising the display device according to claim 19.

* * * * *